INVENTOR.
JACK B. HARVEY
BY
Hopgood and Calimafde
ATTORNEYS.

INVENTOR.
JACK B. HARVEY
BY [signature]
ATTORNEYS.

INVENTOR.
JACK B. HARVEY
BY
Hopgood and Calimafde
ATTORNEYS.

INVENTOR.
JACK B. HARVEY
BY
Hopgood and Calimafde
ATTORNEYS.

June 6, 1967 J. B. HARVEY 3,324,397

VARIABLE DELAY SYSTEM HAVING A PLURALITY OF SUCCESSIVE DELAY SECTIONS EACH OF A VALUE ONE-HALF THAT OF THE PRECEDING SECTION

Filed Feb. 23, 1965 5 Sheets-Sheet 5

INVENTOR.
JACK B. HARVEY
BY
Hopgood and Calimafde
ATTORNEYS.

United States Patent Office 3,324,397

Patented June 6, 1967

3,324,397
VARIABLE DELAY SYSTEM HAVING A PLURALITY OF SUCCESSIVE DELAY SECTIONS EACH OF A VALUE ONE-HALF THAT OF THE PRECEDING SECTION

Jack B. Harvey, Clifton, N.J., assignor to Sichak Associates, Nutley, N.J.

Filed Feb. 23, 1965, Ser. No. 434,569
7 Claims. (Cl. 328—55)

This invention relates to a variable delay system which delays an incident signal in response to an electrical control system. While having general application, this invention is particularly directed to a system for maximal combining of signals one of which must be continuously and variably delayed before such combining occurs. Specifically this invention relates to an FM variable delay line.

In another aspect, this invention relates to a variable gain amplifier.

This invention is an improvement upon the invention of Sichak et al. S.N. 350,908 filed on Mar. 10, 1964 and assigned to the assignee of this application. Further reference may be made to such patent application S.N. 350,908 as may be necessary during the following discussion.

As previously noted in S.N. 350,908, the prior art variable delay systems exhibit significant disadvantages: mechanical adjustments are difficult, high speed applications impractical and stability is difficult. In S.N. 350,908, there is disclosed a basic concept of employing fixed delay sections in successive binary ratio. These sections may be controllably selected to derive a desired delay. A bidirectional counter and logic network are used to translate the counter outputs and appropriately set switches between the delay sections. The counter itself is driven by an applied plus or minus signal.

In order to prevent loss of information switching, the primary delay has associated auxiliary delays. The auxiliary delays are available on a standby basis and vary as the primary delay changes.

The numerous switching positions as well as other sequential and scan operations in the prior S.N. 350,908 produce noise and distortion in the output signal. Further, amplitude variations are caused by multipath reflections within the delay line elements.

Since the variable delay line presents separate primary and auxiliary delays to signals which are faded in and out or combined in a selective mode, these signal amplitude characteristics can not be eliminated. An FM mode of operation is therefore unsatisfactory unless the amplitude characteristics are not lost.

It is an object of this invention to provide an improved electronically variable delay circuit having lower noise and distortion characteristics.

It is another object of this invention to provide an electronically variable delay circuit which exhibits smooth transition during delay variation.

It is another object to provide a variable electronic delay system which utilizes a frequency mode of operation.

It is still another object of this invention to provide an electronic delay system which combines signals in preselected but variable ratios in an improved and reliable manner.

It is yet another object of this invention to provide an electronic delay system which reduces multipath reflection and other sources of distortion and which adds selective amplitudes and delays of the signal to be delayed in an FM mode of operation.

It is a still further object of this invention to provide an improved system for optimally combining taped data.

A further object of this invention is to provide an improved variable gain device.

Briefly, in this invention the information signal which is to be variably delayed frequency modulates a carrier which is applied to a "branch" or channel of the electronic variable delay. Each branch may be generally considered as presenting a primary delay and an auxiliary delay, the latter taking effect during the interval that the primary delay is varied, although the primary and auxiliary character of each may vary. Delay sections of continuously variable numbers and distributions are controllably positioned to alter the delay presented. These delay sections are by-passed or switched from one branch to the other according to a known logic system. The branches signals (which are delayed by primary and auxiliary amounts) are applied to respective frequency modulation (FM) discriminators whose output varies with the amplitude as well as frequency of the applied signals. That is, the conventional fixed limiting stage in the input of the discriminator is omitted. In each branch, variable limiting means are provided preceding the FM discriminators which controllably select the amount or amplitude of signal which flows through each branch so that the primary and auxiliary delayed signals are faded in and out. When the signals from the respective branches are added, the resulting signal represents a continuously variably delayed information signal.

*Tape combining system*

Figure 1:
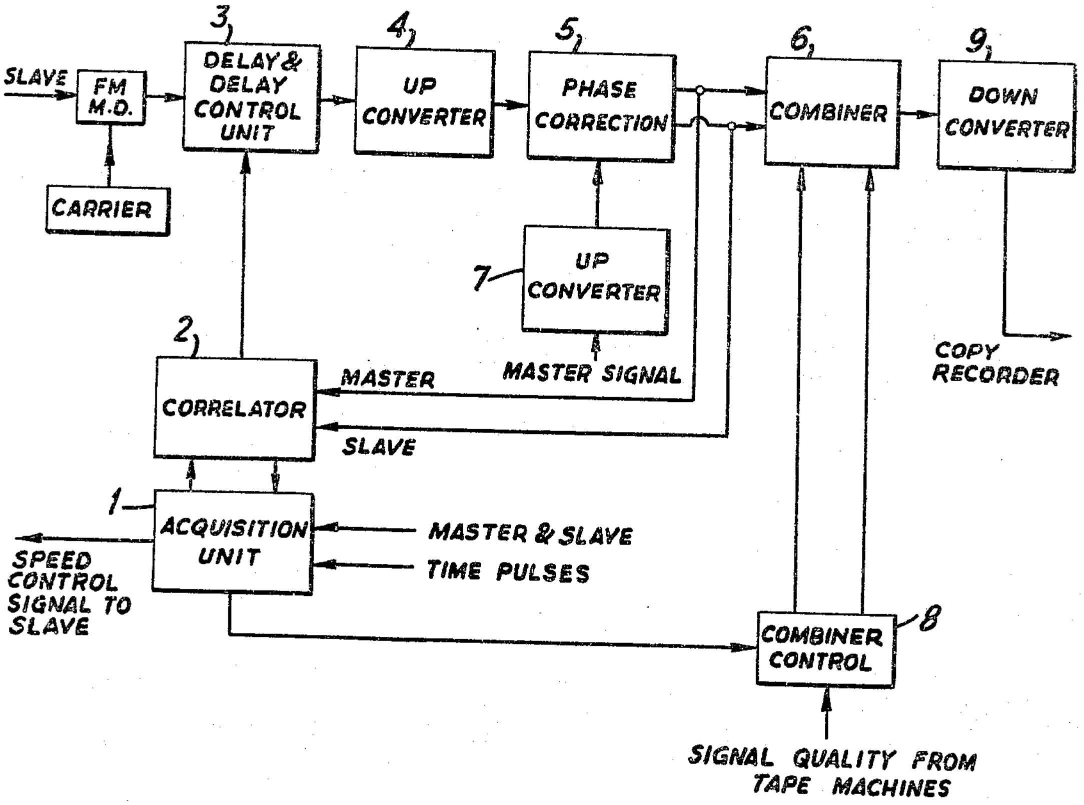
FIG. 1 is a block diagram illustrating the signal flow of a tape combining system embodying the invention.

There is shown in FIG. 1 a system for optimally combining several telemetry tape recordings into one, and automatically producing the best composite record obtainable from these overlapping individual records obtained by stations having only partial coverage of the missile trajectory.

When combining tape recordings, particularly those derived from telemetry signals, the quality of the composite data is of primary importance. One of the greatest problems involves the slaving together of separately recorded wideband signals with sufficient accuracy and speed of response to maintain coherent addition despite rapidly fluctuating errors in relative timing. These errors arise from the eccentricity of the capstan and various other mechanical problems affecting tape translation in the reproducers, which give rise to "wow" and "flutter." It is to be noted that even the finest reproducers exhibit timing fluctuations of $\pm 100$ to 300 $\mu$sec.

In the arrangement shown two tapes are combined: one is arbitrarily designated the "master," the other being the "slave" to which the corrections are applied. Should it be desired to combine more than two tapes, redundant circuitry will be employed; again with a single tape acting as master.

Initially, relative tape positioning is accomplished manually so that the slave is several milliseconds behind the master. This time displacement is chosen to be somewhat greater than the maximum expected error and is accomplished by matching as closely as possible the time pulses (standard in telemetery tapes) stored on the tapes, with a predetermined $\Delta t$ offset. Both tapes are then set in motion and the master and slave time pulses converted into voltages by converters of the acquisition unit 1.

The acquisition unit uses the time pulses from the master and slave tapes to position the tapes. The slave tape is then moved relative to the other until correlation is obtained. The operation of the acquisition unit is inhibited when correlation is obtained and the slave reproducer speed is controlled by a signal from the correlator. The difference between the converted voltages is then applied to the slave capstan servo (not shown) to increase the speed of the slave reproducer by 1% until an output from correlator 2 is obtained. Upon time pulse synchronism, the correlator 2 and combiner control 8 are enabled thus avoiding their functioning at what might be false correlation within another time period.

Although the timing pulses provide some degree of tape correspondence, time codes recorded at different stations, may differ by as much as 10 millisec., and another 15 millisec. discrepancy is possible due to differences in propagation time; hence correlation is not necessarily continuously effected at time code correspondence.

Once initial correlation is achieved the acquisition unit is inhibited and the delay is accomplished as herein described. The acquisition unit is explained more fully in the above identified patent application.

*Correlator*

The correlator produces a control voltage for the delay and delay control unit 3 by correlating the master and slave wideband predetection signals directly, indicating by a plus or minus whether the relative timing of the slave is advanced or retarded. Since correlation may be indicated at several ambiguous points, spaced in multiples of the commutation period, a comparison of demodulated data may be employed to resolve ambiguities. Inasmuch as the correlator "sees" the slave signal subsequent to delay and phase adjustment, initially the delay is preset to one-half the total delay to allow flexibility in either direction. As noted previously, upon correlation being obtained, the acquisition control is inhibited. Slave reproducer speed control from this point on will be explained therefore in connection with the description of the delay and delay control unit 3. Thus, slave reproducer speed control by the utilization of time pulses represents a coarse control while the fine control is achieved essentially by the delay and delay control unit.

The remaining elements of FIG. 1 will be described so that the delay and delay control unit's function in the basic system may be appreciated.

The slave signal to be delayed frequency modulates a carrier signal, the resulting signal being applied to the delay and delay control unit 3. The slave signal from the delay and delay control unit 3, having been suitably delayed to insure time coincidence with the master, is fed via an up converter 4 to the phase correction circuit 5. The function of the latter is to remove phase and frequency errors caused by transmititng and receiving oscillators, Doppler effect, etc. The master signal is also applied to phase correction circuit via up converter 7. The combiner 6 performs maximal ratio combining of the now compensated signals. Control voltages may be obtained from the recorded AGC signals or by rectifying out of band noise in the combiner control 8. Both methods are well known and hence will not be described further, save to note that it may be desirable, because of tape dropout, to employ both methods simultaneously.

The master and slave combined signal is now reduced in frequency by the down converter 9 and may be recorded on a single track.

*Delay control*

Figure 2:
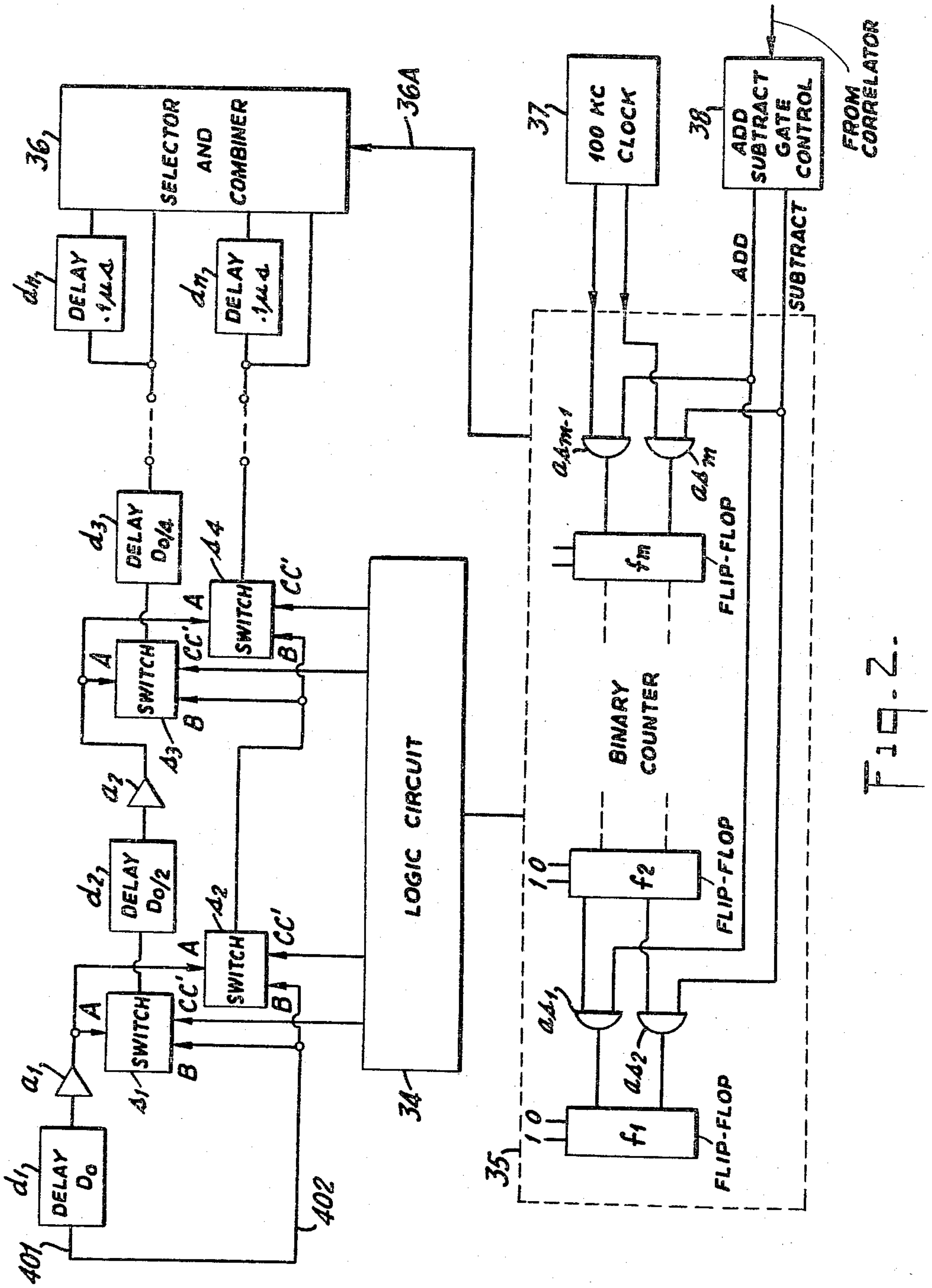
FIG. 2 is a block and block detail of the delay and delay control elements included in this invention.

The delay and delay control unit 3 of FIG. 1 may be further explained in connection with the drawings FIGS. 2, 3 and 4. Referring to FIG. 2, the delay and delay control unit consisting essentially of three parts: a delay line comprising delay sections $d_1$–$d_n$ and interstage switches $s_1$, $s_2$ . . . operating at a selected frequency, such as 59 or 60 mc.; a control circuit which includes a logic circuit 34 and a bidirectional binary counter 35; and a selector and combiner 36. Each delay section is composed of a delay unit and where necessary an amplifier. For long delays (up to 500 μsec.), quartz delay sections operating at carrier frequencies of 60 mc. are used. For short delays, up to and including 0.8 μsec. RG–55 coaxial cables are used. Amplifiers $a_1$ . . . $a_n$ are required to compensate for the attenuation of the larger quartz delays individually and the conglomerate cable and small quartz delay losses. The amplifiers are saturated in view of the frequency modulation employed. The delay sections are adjusted for a constant transmission gain (or loss) so that the output power is dependent of the delay setting.

The delay introduced by each successive delay section is one-half that of the preceding section. The total delay range D is therefore:

$$D=D_o\left(1-\frac{1}{2^n}\right)=D_n(2^n-1)$$

Where:

$D_o$=largest section delay
$D_n$=smallest section delay
$n$=total number of stages.

This provides a system optimum in the sense that doubling the delay increases the complexity and cost by $(1+n)/_n$ whereas for other systems, doubling the delay doubles the complexity and cost. Thus, for a delay range of 819.11 μsec., only 13 sections with delays of 409.6, 204.8, 102.4 . . . 6.4, 3.2 . . . .2 and .1 μsec. are required. This range of delay allows the mis-phasing loss to be held to less than 1 db. For purposes of illustration, however, the description following will only include sections sufficient in number for understanding the function being analyzed.

*Switching*

The delay at any instant is controlled by the switches $s_1$, $s_2$ . . . which are in turn controlled by the binary counter 35 via the logic circuit 34. The binary counter 35 is bidirectional, adding or subtracting the least significant binary digit in response to the polarity of the correlator output; accumulating a count upon its flip-flop stages $f_1$, $f_2$ . . . equal to the desired delay. Counter stepping is accomplished in response to 100 kc. clock pulses, the source 37 of which is connected to interstage control gates $as_m$ and $as_m-1$ within the counter which have applied thereto, as do the gates $as_1$, $as_2$ . . ., the add-subtract gate control signals. The add-subtract gate control 38 is in turn controlled by the plus-minus error signal of the correlator. Such bidirectional binary counters are well known and it will be appreciated that the one illustrated has been abbreviated in detail for purposes of clarity.

Since the value of delay employed is controlled by a bidirectional counter whose value, when changing, always steps binary serially (e.g. 1000–0111–0110 etc.) the delay employed may change in like fashion (e.g. 6.4–6.3–6.2), and thus minimal transitions are ensured.

*Primary and auxiliary delay*

The ararngement described thus far has not taken into account switching transients and the inherent loss of information produced in wideband applications, such as the tape combiner embodiment, by the quantization of time delay and the resulting signal loss when switching from one to the other. This transient effect is reduced by having two auxiliary delays for each primary operating delay. These delays are of a value one delay unit less and one delay unit larger than the primary delay. Representing the required delay as a binary number, a typical situation is:

| Delay increment | 1.6 | .8 | .4 | .2 | .1 |
|---|---|---|---|---|---|
| Auxiliary delay | 1 | 0 | 0 | 0 | 1 |
| Primary delay | 1 | 0 | 0 | 0 | 0 |
| Auxiliary delay | 0 | 1 | 1 | 1 | 1 |

The first line represents a delay of 1.7 μsec. the second a delay of 1.6 μsec., and the third 1.5 μsec. The primary and auxiliary delays are automatically set up by the logic circuit as will be explained, and as the primary delay changes so do the auxiliary delays so that no information is lost as the delay changes. This permits a fading in and out of delays by the selector and combiner 36 in the desired direction. Thus, for example, if a delay of 1.6 μsec. is required by the correlator 2 via the counter, and this is varied in either direction, one of the auxiliary delays (that in the appropriate direction) is faded in while the primary is faded out. The auxiliary delay now attains primary status.

Figure 4:
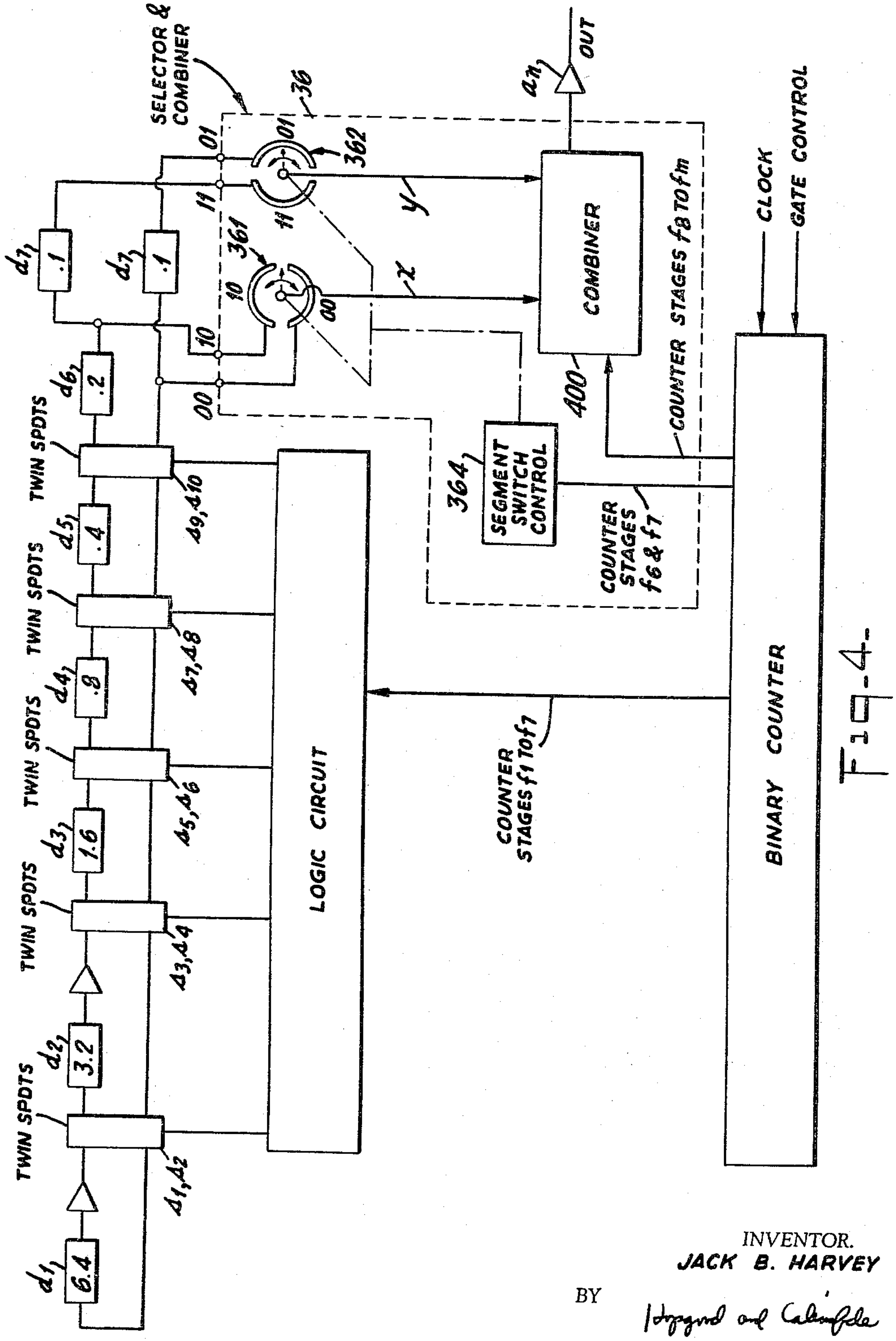
FIG. 4 is a block diagram illustrating in greater detail the relationship of the FM delay line and delay control of FIG. 3 and the overall block detail of FIG. 2.

The proper cascading of delay sections is determined by the setting of the switching elements shown in FIG. 4; each of which selects the connection preceding delay or by-pass to succeeding delay, or preceding delay or by-pass to succeeding by-pass (see FIG. 2). These switching elements are designed to have a high impedance input and a low load impedance, so that the same amount of power is delivered to each of one or two succeeding sections. Each switch connects one of two inputs (A or B) to a common load, depending upon which side, C or C′, is gated "on" or "off."

The switch elements themselves are controlled via logic circuit 34 by the settings of the counter flip flops. Thus, the counter ultimately determines which delay is primary, as well as the auxiliary connections. The setting of switches at a given interstage is determined by the count (0 or 1) stored in the preceding stage, and in the two following stages of the counter.

The cascading of delay elements as well as the logic circuit 34 and the binary counter 35 are further explained in the above identified patent application.

*Selecting and combining*

Figure 3:
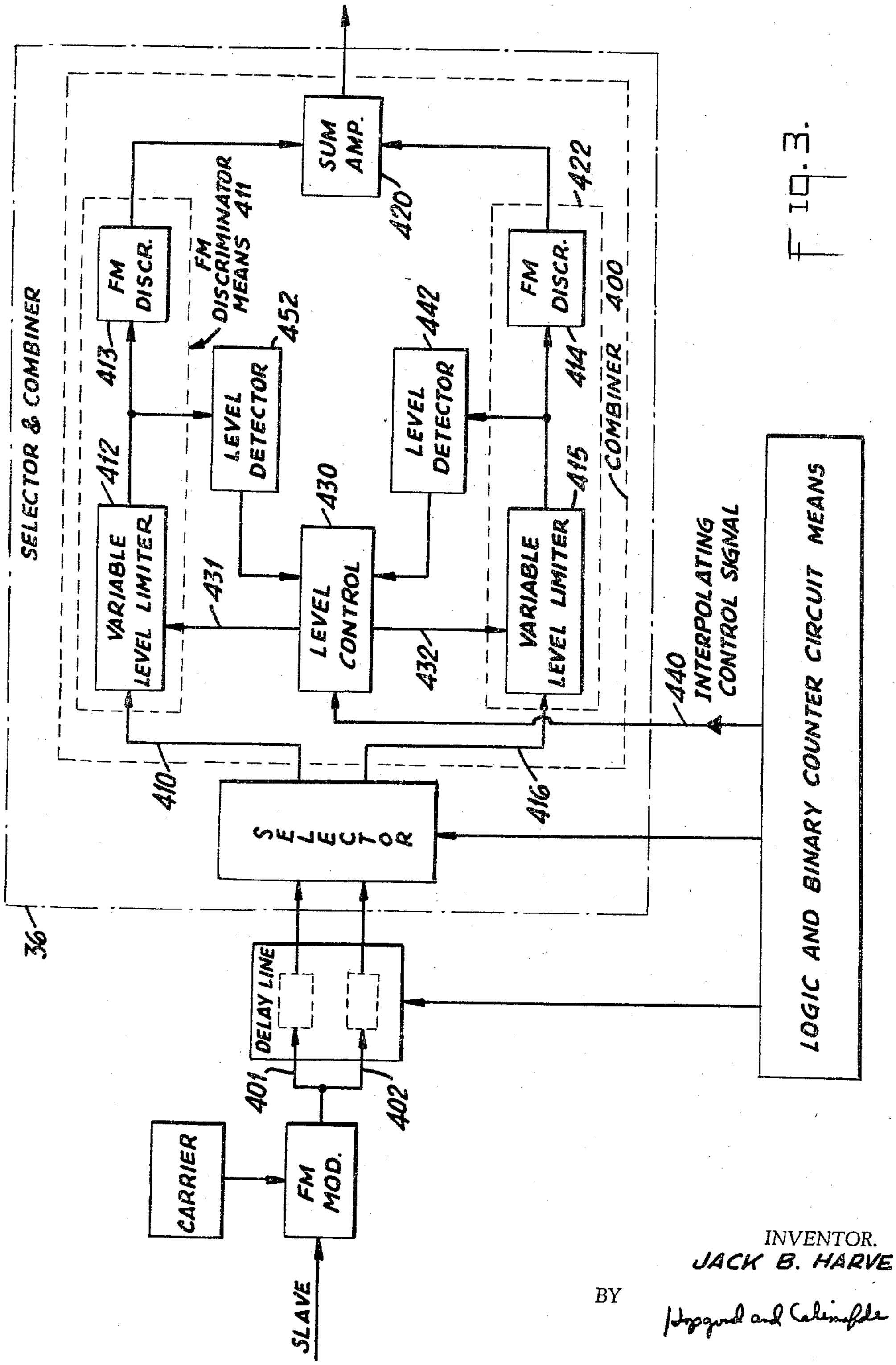
FIG. 3 is a detailed block diagram of the FM delay line and delay control.

The selector and combiner are shown diagrammatically in FIGS. 2, 3 and 4. The selector and combiner receive a control signal via line 36a of FIG. 2, such line being diagrammatic.

In FIG. 4, each set of interstage switches is, for the sake of simplicity, grouped within a single box labeled "twin SPDT's" (single pole double throw switches). The selector and combiner selects the primary and operational auxiliary delay and varies the emphasis between these signals.

Selectors 361 and 362 shown as rotating switches are only illustrated in that manner for diagrammatic purposes since as explained in the prior patent application electronic switches may be utilized. The outputs from the wipers are applied over the leads designated XY and to the combiner 400 which is shown in more detail in FIG. 3. Before discussing the details of the combiner 400 it may be desirable to complete the description of operation of the system of FIG. 4, since it is basic to the invention to understand how the delays may be varied while avoiding any large discontinuities.

The four delay line outputs are led to a pair of segmented switches 361 and 362 whose respective rotary contacts are driven in common by the switch control 364. When the segments are disposed, and connected to the delay line outputs, as shown, it may be seen that no matter which rotor contact is located centrally of a segment the other rotor contact sits in a "crack" on either side of which the auxiliary delays are present. If for example the primary delay were 11<u>01</u>, auxiliary delays 11<u>00</u> and and 11<u>10</u> would be on standby. This obtains no matter which lead X or Y the primary delay appears on. The necessity for two standby delays rests on the fact that it is not known which direction the counter will take next; i.e. whether the correlator will call for more or less delay. The segment switch control 364 positions the rotors in response to the counter stages which are the least significant counter stages for controlling the delay line switches.

Since the rotor control by-passes the logic circuit it is responsive to only the primary delay indication. However, as has been described the disposition of the segments assumes the responsibility for auxiliary delays. When the rotor begins to rotate in response to a new count, and auxiliary segment is immediately picked up on one of the leads X or Y (X in the shown arrangement).

The combiner 400 (FIGS. 3 and 4) assumes the function of fading out the primary and fading in the auxiliary which has now achieved primary status.

A technique for so doing represents a substantial improvement in reliability and simplicity as well as eliminating the deficiency of distortion and noise to which previous mention has been made. As will be apparent, a controlled variable gain device having other applications is employed.

Referring now to FIG. 3 it will be recalled that the slave signal frequency modulates a carrier and applies the output over the branches of the delay line indicated by the numerals 401 and 402 (see also FIG. 2). The output from the delay means constituting the primary and auxiliary delays apply to the selector and combiner 36, the selector being shown in block form. The primary and auxiliary status of these branches varies, although for purposes of this application, it does not matter which has achieved the primary status. The delay line and selector are controlled from signals from the logic and binary counter circuit.

Assuming that the signal over line 410 represents the primary delay, it is applied to a frequency discriminator means 411 which is unique in that it does not have any fixed prelimiting stage. This frequency discriminator means 411 includes a variable level limiter 412 and an FM discriminator stage 413 which stage is to be understood as not having any prelimiting means. Thus the output from the FM discriminator 411 varies with frequency as well as the amplitude, the amplitude being derived as the output from the variable level limiter 412. As used herein, the term FM discriminator necessarily excludes a device such as a ratio detector whose output does not vary with the amplitude of the input signal. A similar FM discriminator means 422 comprising identical FM discriminating stage 414 and variable level limiter means 415 constitutes the second branch over which the auxiliary signal from line 416 may pass.

The signals over these respective branches which comprise the primary and auxiliary delay are added in summing amplifier 420. It will be noted that since the primary and auxiliary signals are phased in and out depending upon the nature of the delay, that the summing amplifier will always represent a composite signal, the weight of the respective components varying.

The level limiter 412 is conventional except that its output is variable because the level control signal 431 varies the level bias. Also, the discriminating stage is conventional and utilizes a resonant circuit to determine the tuning frequency. The resonant frequency is adjusted to conform to the frequency passing through the line.

The fading in and out is coordinated by a level control means 430 which produces outputs over lines 431 and 432 to vary output level of limiters 412 and 415. The signals appearing on leads 431 and 432 vary but the total sum remains the same so that the level control means acts to select a predetermined amount of signals appearing over the respective branches. The branch signals are summed in summing amplifier 420.

The relative amounts of signal appearing on lines 431 and 432 are determined by an interpolating control signal appearing over line 440 from the logic and binary counter circuit means.

The variable level limiters 412 and 415 may be non-linear devices and, therefore, an additionl compensation signal is applied from level detectors 452 and 442 to modify the signals over lines 431 and 432 so that limiters 412 and 415 are more linear. Each of the level detectors 452 and 442 include AM detectors sensitive to the amplitude of the output from the limiters.

Figure 5:
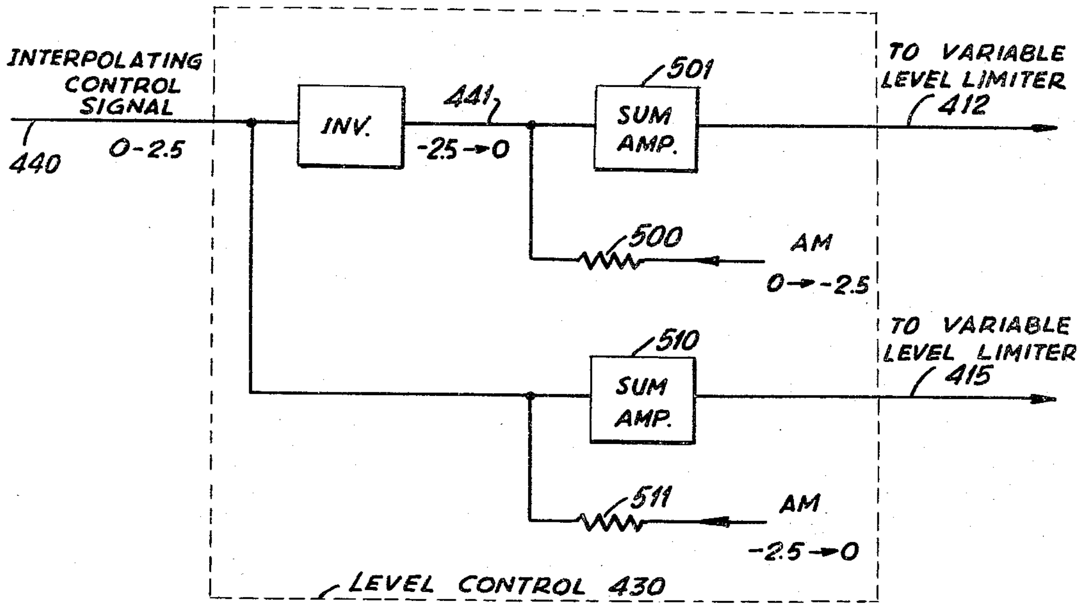
FIG. 5 is a block diagram of the level control means.

Level detector 452 acts as an AM detector to rectify and smooth the output signal from limiter 412 to apply an AM signal over resistor 500 (FIG. 5) to a summing amplifier 501. The control signal 440 may be processed so that the signal appearing on line 441 is negative with respect to the AM input signal. Of course, if the control signal is not processed, the AM signal can be processed so that in effect the signal over resistor 500 is a negative feedback signal.

The output from amplifier 501 is linear with respect to the control signal. The gain of amplifier 501 may be 10,000 while the outputs from limiter 412 may vary from +6 to −6 volts, it being noted that the output from limiter 415 varies inversely from −6 to +6 volts. The output from limiter 415 is achieved similarly by applying the control signal from line 440 to summing amplifier 510 to which an AM signal from level detector 442 is also applied over a resistor.

The resulting input signals to amplifiers 501 and 510 is thus variable over a small range and the negative feedback input provides a very linear output with respect to the control signals.

Figure 6:
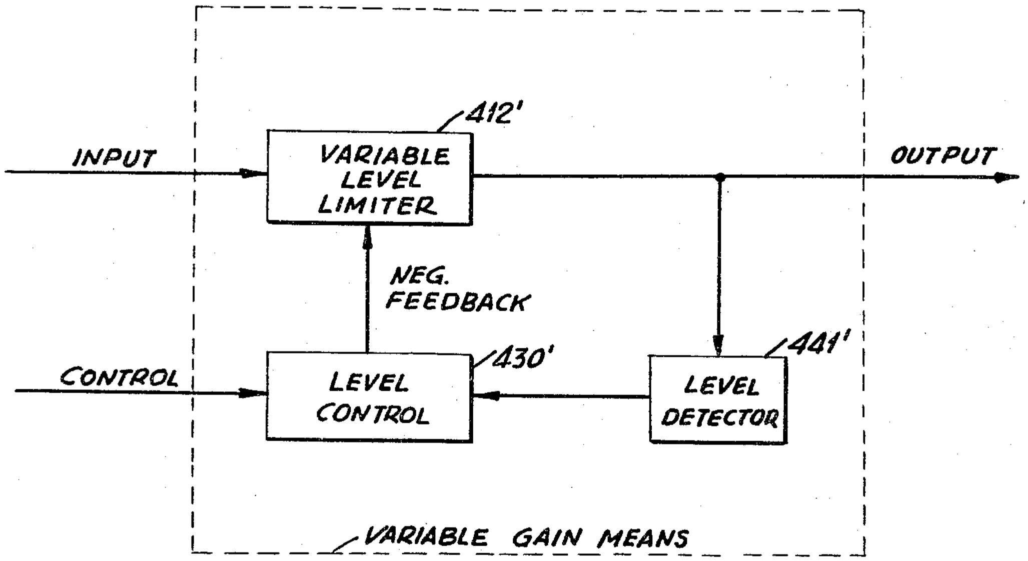
FIG. 6 is a block diagram of a unitary variable gain means.

It will be noted that the circuitry of the combiner 400 utilizes a variable gain limiter means which has a separate utility and comprises the component illustrated in FIG. 6. The input signal passes through a limiter 412'. This signal may or may not be frequency modulated. Level detector 441' detects the level and applies a feedback connection through the level control means 430' which in turn responds to a control signal. The prime numerals indicate that the components themselves are the same as the unprimed components.

Thus, the system disclosed allows a signal which must be processed through a plurality of branches to be frequency modulated, while retaining and controlling amplitude variations in the respective branches from an amplitude summation. The respective amounts of amplitude components in the summation is accurately and linearly controlled in response to a control signal. The variable gain means achieves a distinct measure of linearity while possessing the advantage in that the control signal does not appear in the output.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. An electronically variable delay system for delaying a signal comprising: a plurality of successive delay sections each of a value one-half that of the preceding section; a delay section by-pass associated with each said delay sections; switch means connected between each delay section and associated by-pass and the succeeding delay section and associated by-pass for the selective cascading of said delay sections; means for setting each of said switch means in accordance with the desired delay, and means coupled to the last successive delay section and associated by-pass for selecting the desired delay, means for applying said signal to said delay sections as an FM modulated signal.

2. An electronically variable delay system as claimed in claim 1, in which said setting means comprises: a bidirectional binary counter having individual stage outputs for indicating thereon the desired delay in binary form; means connected to said counter for the setting thereof in response to an incident delay indication; and means coupling the counter stage outputs with said switch means for cascading said delay sections in accordance with the count contained in said counter.

3. The delay system of claim 1 in which said FM modulated signal is delayed by different amounts in said system to provide two available primary and auxiliary outputs, means to selectively combine said primary and auxiliary outputs including means responsive to the amplitude and frequency of said outputs.

4. An electronically variable FM delay system for delaying a signal comprising a plurality of successive delay sections each of a value one-half that of the preceding section; a delay section by-pass associated with each said delay sections; switch means connected between each delay section and associated by-pass and the succeeding delay section and associated by-pass for the selective cascading of said delay sections; means for setting each of said switch means in accordance with the desired delay, an auxiliary delay a predetermined value less than said desired delay; and means, including delay sections of said predetermined value, coupled to the last successive delay section and associated by-pass for simultaneously providing the desired and auxiliary delays; means to apply said signal as a frequency modulating signal to said delay; selecting and combining means to selectively combine signals passing through said primary and auxiliary delays; said selecting and combining means including at least two channels each including variable limiting means and frequency discriminating means; means to add the outputs in said channels; and means to control the level of each of said limiting means.

5. The electronically variable delay as claimed in claim 4 further comprising means, connected to said means for simultaneously providing the desired and auxiliary delays, and responsive to predetermined counter stages for switching from the desired delay to either of the auxiliary delays upon the stepping of said counter.

6 A variable electronic delay system in which a signal which is to be delayed passes through a delay line having a plurality of successive delay sections each of a value one-half that of the preceding section; a delay section by-pass associated with each of said delay sections; switch means connected between each delay section and associated by-pass and the succeeding delay section and associated by-pass for the selective cascading of said delay sections; a bidirectional binary counter having individual stage outputs for indicating thereon the desired delay in binary form; means connected to said counter for the serial stepping thereof in response to an incident delay indication; logic means coupled between each said switch means and the successive counter stages indicating the preceding and two succeeding delays in binary form, for setting said switch binary form; means connected to said counter for the serial stepping thereof in response to an incident delay indication; logic means coupled between each said switch means and the successive counter stages indicating the preceding and two succeeding delays in binary form, for setting said switch means in accordance with the desired delay, an auxiliary delay a predetemined value greater than an auxiliary delay a predetermined value less than said desired delay; and means, including delay sections of said predetermined value, coupled to the last successive delay section and associated by-pass for simultaneously providing the desired and auxiliary delays; the invention comprising:

- means for FM modulating a carrier signal with said signals, whereby primary and auxiliary FM signals are provided each being delayed according to said primary and auxiliary delays;
- means to select and combine said primary and auxiliary signals, including a first combining channel having variable limiting means and FM discriminating means;

a second combining channel having a second variable limiting means and second FM discriminating means;

means to additively combine the outputs from said FM discriminating means, and level control means responsive to said logic means to vary each of said variable limiting means inversely to each other.

7. The delay system of claim 6 further including a negative feedback means for each channel determining the output level from said variable limiting means to vary the output from said level control means.

References Cited

UNITED STATES PATENTS

| | | | |
|---|---|---|---|
| 2,610,292 | 9/1952 | Bond et al. ______ | 325—305 X |
| 2,953,694 | 9/1960 | Wilson ____________ | 333—29 X |
| 3,059,189 | 10/1962 | Presisig ____________ | 329—135 |
| 3,086,175 | 4/1963 | Barditch et al. ____ | 329—134 X |
| 3,173,095 | 3/1965 | Wagner __________ | 329—134 X |
| 3,189,820 | 6/1965 | Lowman. | |

HERMAN KARL SAALBACH, *Primary Examiner.*

P. L. GENSLER, *Assistant Examiner.*